Feb. 12, 1963 E. W. MURR 3,077,114
LINE TENSION RELEASE DEVICE
Filed June 9, 1961
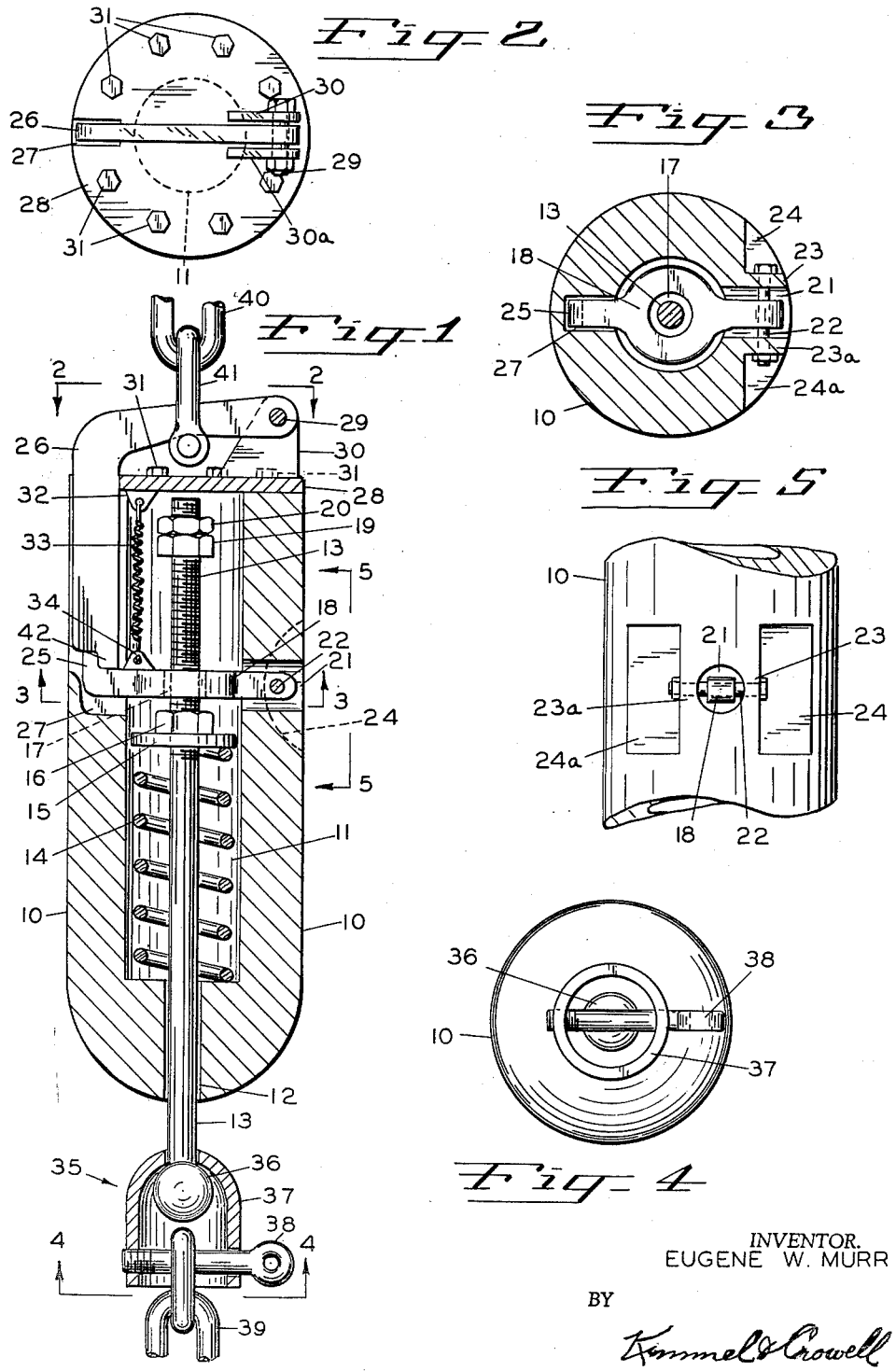
INVENTOR.
EUGENE W. MURR
BY
Kimmel & Crowell
ATTORNEYS

United States Patent Office 3,077,114
Patented Feb. 12, 1963

3,077,114
LINE TENSION RELEASE DEVICE
Eugene W. Murr, 574 N. 32nd, Springfield, Oreg.
Filed June 9, 1961, Ser. No. 116,057
3 Claims. (Cl. 74—2)

This invention relates to an improvement in a tension release for cables, lines, chains and the like and has as its primary object the provision of a simple and efficient release mechanism which can be adjusted to different degrees of pull so that it will release if the cable, or its load, becomes snagged, or otherwise fouled, thereby preventing the cable from breaking. By releasing and freeing the cable, said cable is prevented from breaking and injuring workmen or damaging property.

As conducive to a clearer understanding of this invention, it may here be pointed out that in the field of logging, for example, this device is invaluable in the yarding operations, where logs are prone to become hung-up on stumps and break the main line cables of the yarder, causing injury and damage. Also, valuable time is saved by preventing the cables from becoming broken and then the necessary replacement of same.

However, the device is not limited to any one field of usage, but is designed for use wherever cables, lines, chains, or the like are used.

Other objects will in part be obvious and in part be pointed out hereinafter and shown in the accompanying drawings wherein:

FIGURE 1 is a longitudinal cross-section of one form of device, embodying the instant invention showing the inner structure and component parts thereof;

FIGURE 2 is an end view, taken substantially along line 2—2 of FIG. 1, as viewed in the direction of the arrows, illustrating the removable end plate;

FIGURE 3 is a cross-sectional view of FIG. 1 taken substantially along line 3—3, as viewed in the direction of the arrows, showing the shape of the locking lever;

FIGURE 4 is an end elevation of FIG. 1 taken along line 4—4, as viewed in the direction of the arrows; and, FIGURE 5 is a fragmentary detail view being taken substantially along line 5—5 of FIG. 1, as viewed in the direction of the arrows.

Similar reference characters refer to similar parts throughout the several views of the drawing.

The invention consists of a cylindrical body 10 with an axial bore forming a chamber 11 through its center, which is reduced down to the diameter of a bore 12 for a threaded rod 13. The threaded rod 13, operating within the axial bore 12, has a compression spring 14 around it, spring 14 being retained by a spring retainer plate 15 and a spring compression adjustment nut 16. Rod 13 continues through a hole 17, formed through the center of a releasable locking lever 18, the hole 17 being large enough to provide for free movement of the rod 13 within locking lever 18.

Near the terminal end of rod 13 there is an adjustable trip nut 19 with an associated locking nut 20. The nuts 16 and 19 form abutments for the locking lever 18. The aforementioned locking lever 18 is pivotally mounted within a radial bore 21, and on the body 10 by means of a pivot pin or bolt 22 which attaches same to inset lugs 23 and 23a. These lugs are formed within the wall of the body 10 by milling out cavities 24 and 24a, as best illustrated in FIGS. 3 and 5. On the opposite end of locking lever 18 there is a right angle nose 25, the purpose of which is to retain an L-shaped release arm 26 within a cavity or slot 27, which is located within the wall of the body 10, as best shown in FIGS. 1 and 2.

The release arm 26 is pivotally mounted on an end cap or plate 28 by means of a pivot pin or bolt 29 and ears 30 and 30a, which are integral with the end plate 28. The end plate 28 is secured to the body 10 by stud bolts 31. Located on the inside face of end plate 28 there is a locking lever retaining spring appendage or ear 32, to which is attached one end of a locking lever retaining spring 33. The opposite end of locking lever retaining spring 33 is attached to a companion ear 34, which is formed located on the near side of locking lever 18, as shown in FIG. 1.

Referring back to the rod 13, this rod has on its front or lead end a ball and cup swivel 35, consisting of a ball 36, integrally formed on the lead end of shaft 13, operating within a cup 37. Cup 37 has an associated cable or chain securing eye screw 38.

In the use and operation of this device, a cable or chain 39 is secured to the ball and cup swivel 35 by means of chain securing eye screw 38. Next, a cable or chain 40 has its associated U shackle 41 slipped over the end of the release arm 26 and positioned on same in a slight depression (not shown), to insure a straight through pull, as illustrated in FIG. 1. The release arm 26 is swung into its retained or locked-in position, within cavity or slot 27 and locking lever 18, set, so that the nose 25 engages a shoulder 42 at the end of the release arm 26. The device is now set for use, with locking lever retaining spring 33 holding the locking lever in its engaged position with the shoulder 25 on the release arm 26. Locking lever retaining spring 33 has such a modulus that it will resist and overcome the initial shock on the device, when the slack is taken up on the cable or chain, thus preventing accidental release of the device. The unit is placed or located at a point along the cable or chain 39—40 between the pulling source and the load to be towed. When the load becomes fouled or snagged, the device will release when a certain pre-set compression is attained, the degree of this compression being determined by the spring compression adjustment nut 16. The distance that the rod 13 must travel in order for the trip nut 10 to strike locking lever 18, releasing it, is pre-set by merely removing end plate 28 and using a suitable wrench to adjust the trip nut 19 inwardly or outwardly and accordingly vary its length of travel. To retain this adjustment, the locking nut 20 is tightened against the trip nut 19.

The lead end of the body 10 is hemispherical as shown in FIG. 1 so as to prevent or minimize the tendency of this device itself from becoming fouled.

As can now be seen, a line tension release has been devised which is easy to use and economical to manufacture, while affording the greatest possible safety standards.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A line tension release device comprised by a body having a bore extending from one end throughout the greater part of its length and a bore of reduced diameter extending for the remainder of its length, a radial bore through its side wall at approximately its mid-section and a transversely aligned slot in the side wall opposite the radial bore, a rod slidably mounted in the bores in the body and adapted to receive a cable at its outer end, spaced abutments on said rod within the first bore, a compression spring within the first bore surrounding the rod and positioned between one of said abutments and one end of the first bore, a locking lever pivotally mounted at one end in said radial bore, positioned transversely of the rod and between the spaced abutments on the latter and extending at its other end into the slot, an angular release arm pivotally mounted at one end on the first end of the body, adapted to receive a cable in axial alignment with the rod and engageable at its other end with the locking lever, and a tension spring connected at one end to the locking lever and at its other end to the first end of the body for normally holding the locking lever in engagement with the angular release arm.

2. A line tension release device comprised by a body having a bore extending from one end throughout the greater part of its length and a bore of reduced diameter extending for the remainder of its length, a radial bore through its side wall at approximately its mid-section and a transversely aligned slot in the side wall opposite the radial bore, a rod slidably mounted in the bores in the body and adapted to receive a cable at its outer end, spaced abutments on said rod within said first bore, a locking lever pivotally mounted at one end in said radial bore, positioned transversely of the rod and having a hole therein receiving the rod between the spaced abutments on the latter and extending at its other end into the slot, an angular release arm pivotally mounted at one end on the first end of the body, adapted to receive a cable in axial alignment with the rod and engageable at its other end with the locking lever, and a tension spring connected at one end to the locking bar and to the first end of the body for normally holding the locking lever in engagement with the angular release arm.

3. A line tension release device comprised by a body having a bore extending from one end throughout the greater part of its length and a bore of reduced diameter extending for the remainder of it length, a radial bore through the side wall at approximately its mid-section, and a transversely aligned slot in the side wall opposite the radial bore and extending longitudinally to the first end, a rod slidably mounted in the bores in the body and adapted to receive a cable at its outer end, spaced abutments on said rod within said first bore, a locking lever pivotally mounted at one end in said radial bore, positioned transversely of the rod and having a hole therein receiving the rod between the spaced abutments on the latter and extending at its other end into the slot, a plate closing the first end of the body, an angular release lever having one arm pivotally mounted on the plate in longitudinal alignment with the radial bore in the body and the other arm extending through the longitudinal slot in the body in releasable engagement with the locking lever, and a tension spring connected between the plate and the locking lever for normally holding the latter in engagement with the release lever.

References Cited in the file of this patent
UNITED STATES PATENTS

| | | |
|---|---|---|
| 1,094,135 | Donaldson | Apr. 21, 1914 |
| 1,208,863 | Waldow | Dec. 19, 1916 |
| 1,587,416 | Reed | June 1, 1926 |
| 1,621,604 | Ruggles | Mar. 22, 1927 |
| 2,311,826 | Grasswick | Feb. 23, 1943 |
| 2,483,770 | Hildebrandt | Oct. 4, 1949 |
| 2,547,130 | Kniep | Apr. 3, 1951 |
| 2,604,790 | Derby et al. | July 29, 1952 |
| 2,664,845 | Rhodes et al. | Jan. 5, 1954 |